(No Model.)
C. W. FOX.
MACHINE FOR MAKING SUPPOSITORIES.
No. 509,154. Patented Nov. 21, 1893.
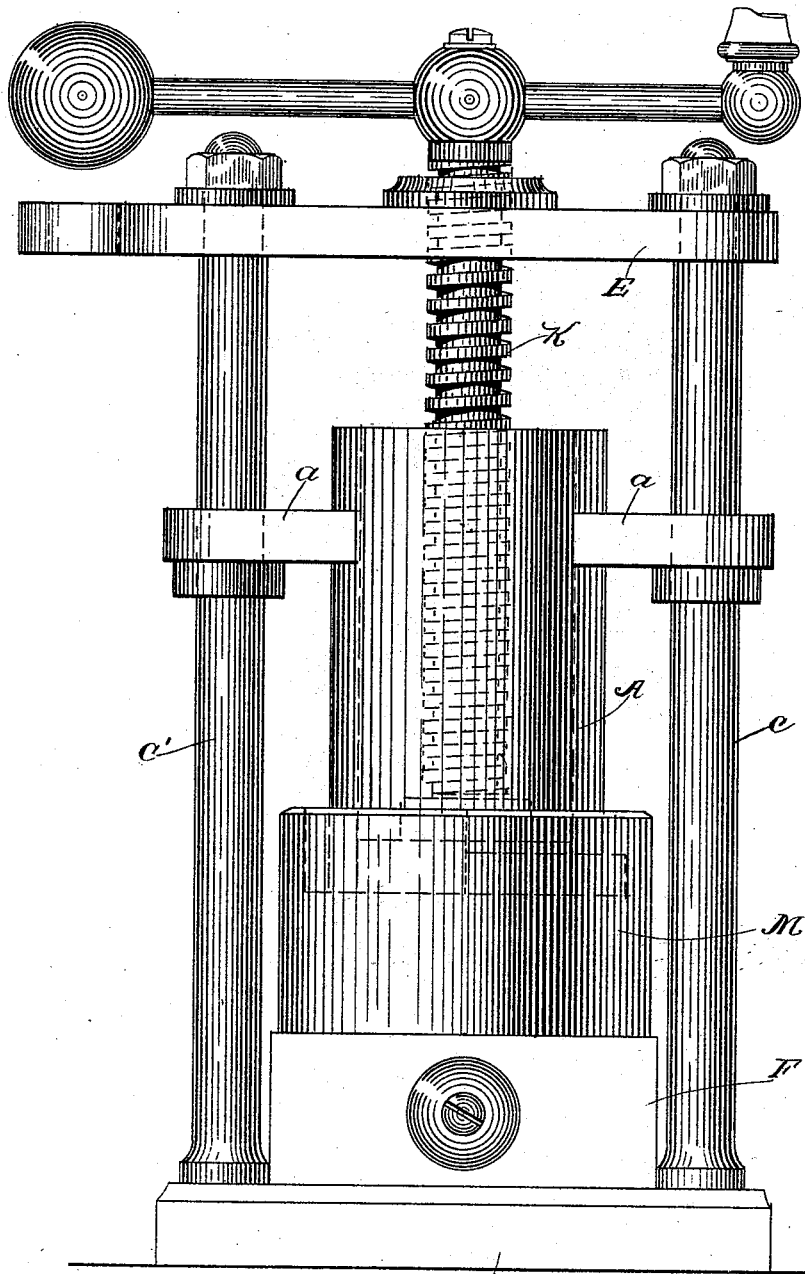

UNITED STATES PATENT OFFICE.

CLARENCE W. FOX, OF SAUGUS, MASSACHUSETTS.

MACHINE FOR MAKING SUPPOSITORIES.

SPECIFICATION forming part of Letters Patent No. 509,154, dated November 21, 1893.

Application filed January 28, 1893. Serial No. 459,943. (No model.)

*To all whom it may concern:*

Be it known that I, CLARENCE W. FOX, of Saugus, county of Essex, State of Massachusetts, have invented an Improvement in Machines for Making Suppositories, of which the following description, in connection with the accompanying drawing, is a specification, like letters on the drawing representing like parts.

This invention is intended as an improvement upon the suppository making machine shown and described in United States Letters Patent No. 452,743, dated May 19, 1891, granted to H. C. Archibald and J. F. Snediker. As therein shown a swinging cylinder was provided, and the mold was contained in said cylinder at the lower end, and a swinging plate covering the lower end of said cylinder served as a bottom therefor, as well as for the mold. The material contained in the cylinder was forced downward by a plunger into the mold, and as the pressure applied is very considerable, the parts must necessarily fit accurately to prevent the material oozing out. In practice the cost of constructing the machine is largely increased because of the necessity of such accurate fitting of the parts, and the wear consequent upon repeatedly swinging the bottom plate to remove the molded suppositories is liable to impair the accuracy thus obtained. Several molds are provided with each machine for different sizes of suppositories, but whenever it is desired to change the mold the material contained in the cylinder must be removed, and the mold withdrawn from the top, which is deemed objectionable by many. In accordance with this invention the cylinder is securely fixed to suitable uprights or supports, and the plunger is connected to a screw rod in any desirable way, which passes through or turns in a swinging cross head. The mold is connected to the lower end of the cylinder exteriorly so that it may be detached without removing the material contained in the cylinder. In lieu of the swinging bottom plate shown in the aforesaid patent, I have provided a block which is placed beneath the lower end of the mold, resting upon the base of the machine, said block having a suitable knob or handle by which it may be removed at will.

The drawing shows in front elevation a machine for making suppositories embodying this invention.

The cylinder A, has ears $a$, which receive and are rigidly secured to the uprights or posts C, C', rising from the base plate D. The plunger, see dotted lines, is contained in said cylinder and is connected in any suitable way to the lower end of the screw rod K, which passes through an internally screw threaded hole in the cross head E, which is pivotally connected at one end to the upper end of the upright or post C, and which has at or near its opposite end an opening or notch to receive the post C', and said cross head is or may be provided with a finger piece by which it may be swung on its pivot. The mold M, having several cavities if desired, is connected to the lower end of the cylinder A, by a bayonet joint connection, as represented by dotted lines. A block F of any suitable shape rests upon the base plate D, beneath the mold M, said block being made to fit snugly against the under side of the mold. As the mold M is filled with the material, the block F, is removed, permitting the removal of the molded suppositories, after which it is replaced and the mold again filled. The block F will be preferably provided with a knob or handle by which it may be easily removed when desired.

I claim—

1. In a machine for making suppositories, the combination of the cylinder A, and posts C, C', to which it is rigidly connected, the plunger and screw rod to which it is connected, the cross head E, pivotally connected at one end to the post C, and having at or near the other end a notch to receive the post C', and having an internally screw threaded hole through it, through which said screw rod passes, and a mold at the lower end of said cylinder, substantially as described.

2. In a machine for making suppositories, the combination of the cylinder and posts or uprights C, C', plunger, screw rod, and cross head, and the mold connected exteriorly to the lower end of said cylinder, and removable bottom therefor, substantially as described.

In testimony whereof I have signed my name to this specification in the presence of two subscribing witnesses.

CLARENCE W. FOX.

Witnesses:
BERNICE J. NOYES,
CHARLES B. CROCKER.